(12) United States Patent
Seethaler et al.

(10) Patent No.: US 8,669,736 B2
(45) Date of Patent: *Mar. 11, 2014

(54) FAST CHARGING SYSTEM AND METHOD WITH MULTIPLE SELECTABLE VOLTAGE LEVELS

(75) Inventors: Kenneth Scott Seethaler, Wake Forest, NC (US); Shigefumi Odaohhara, Kanagawa (JP); Larry Glenn Estes, Durham, NC (US); Jeremy Robert Carlson, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 358 days.

This patent is subject to a terminal disclaimer.

(21) Appl. No.: 13/114,689

(22) Filed: May 24, 2011

(65) Prior Publication Data

US 2012/0299532 A1    Nov. 29, 2012

(51) Int. Cl.
*H01M 10/46* (2006.01)

(52) U.S. Cl.
USPC .................................................. 320/107

(58) Field of Classification Search
USPC .......... 320/107, 114, 125, 127, 128, 138, 160
See application file for complete search history.

(56) References Cited

U.S. PATENT DOCUMENTS

| 6,459,175 B1* | 10/2002 | Potega | 307/149 |
| 2003/0085621 A1* | 5/2003 | Potega | 307/18 |
| 2009/0079262 A1* | 3/2009 | Ohtomo | 307/10.6 |

* cited by examiner

*Primary Examiner* — Edward Tso
(74) *Attorney, Agent, or Firm* — Schwegman Lundberg & Woessner, P.A.

(57) ABSTRACT

A system and method include detecting whether a fast charger module is coupled to a system having a processor and a memory device. If the fast charger module is coupled to the system, a fast charging current is provided from the fast charger module at multiple selectable voltage levels via an internal charger. If the fast charger module is not detected as coupled to the system, a charging current is provided from an AC adapter via the internal charger.

22 Claims, 2 Drawing Sheets

FAST CHARGING SYSTEM AND METHOD WITH MULTIPLE SELECTABLE VOLTAGE LEVELS

BACKGROUND

Notebook computers traditionally take 2-3 hrs to fully charge. There are new Li-ion cells coming on the market that can accept higher charge currents than are available from standard AC adapters. Providing such higher charge currents given associated heat generation and electrical challenges is not a straightforward task. As the charge rate increases, the heat created by the charge circuits also increases.

Given that these devices are small and portable, it is desirable to keep this heat generation as low as possible to keep the devices in desired operating temperatures as well as to conserve energy.

SUMMARY

An apparatus includes an enclosure including a processor and memory device, an internal charger to receive DC power from an external supply and provide charging current to charge a battery, a battery connector to receive current from the internal charger and to provide current to the processor and memory devices, and a fast charge connector to receive a fast charging current from a fast charger module at multiple selectable voltage levels and selectively couple the fast charging current to the internal charger.

In a further embodiments, a system includes an enclosure including a processor and memory devices, an internal charger within the frame to receive DC power from an external supply and provide charging current to charge a battery, a battery connector to receive current from the internal charger and to provide current to the processor and memory devices from a battery when connected, a fast charge connector to receive a fast charging current from a charger module at multiple selectable voltage levels and selectively couple the fast charging current to the internal charger, an internal charger switch coupled between the internal charge circuit and the battery connector, a DC input switch coupled between the a DC input and the internal charger circuit, and a current control device coupled between the fast charge connector and the internal charger.

A system and method include detecting whether a fast charger module is coupled to a system having a processor and a memory device. If the fast charger module is coupled to the system, a fast charging current is provided from the fast charger module at multiple selectable voltage levels via an internal charger. If the fast charger module is not detected as coupled to the system, a charging current is provided from an AC adapter via the internal charger.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the embodiments, and it is to be understood that other embodiments may be utilized and that structural, logical and electrical changes may be made. The following description of example embodiments is, therefore, not to be taken in a limited sense, and the scope is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system.

In various embodiments, an external charger for an apparatus such as a notebook computer is adapted to provide a number of fixed output voltages. The number of such output voltages may be varied as a function of the number of different battery cell configurations that may be used in the notebook computer. For example, a 4s1p battery pack requires a different voltage than a 3s2p pack. The output voltage is set just above the maximum charging voltage. The actual regulation is left to the internal circuit to the device. Since the output voltage is optimal to each battery configuration, losses due to heat are at a minimum.

Figure 1:
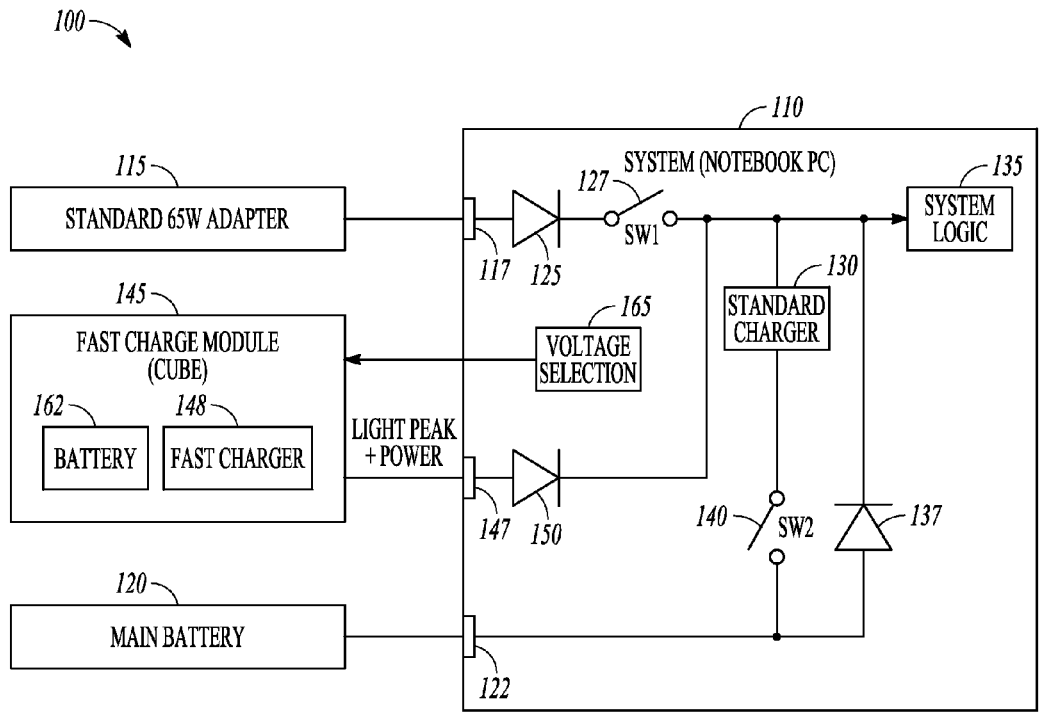
FIG. 1 is a block schematic diagram of a notebook computer coupled to a fast charge module according to an example embodiment.

A charging system 100 for an apparatus, such as a notebook computer 110 is shown block form in FIG. 1. While drawn in block form, reference number 110 is also used to represent an enclosure within which the apparatus is enclosed. A standard AC adapter 115, such as a 20 volt 65 watt adapter is shown coupled to the computer 110 via an AC adapter input 117. The AC adapter 115 provides a suitable DC power source for the notebook computer 110 sufficient to operate electrical components in the computer and to charge a main battery 120 that may be coupled to the computer 110 via a battery connector 122.

In one embodiment, the AC adapter 115 is coupled via a diode 125 and a switch 127, to an internal charging circuit 130 and optionally to system logic 135. Note that the term, diode, is meant to include a current control device allowing the flow of current in a desired direction, including a field effect transistor (FET) configured to behave as a diode with respect to current flow. A FET current control device includes a parasitic diode (body diode) and a switch that are connected in parallel. When FET is in an off state (switch is off), it works as a diode. In some embodiments, FETs may be used to control current flow in all locations since FET exhibits low power losses.

In the case of a notebook computer, the system logic 135 generally includes one or more processors, random access memory devices, data storage devices, monitors and other user interface devices that consume electricity.

The internal charging circuit 130 may be selectively coupled to the battery via an internal charger switch 140 such that the main battery is charged at a standard rate that does not generate undesirable amounts of heat by the internal charging circuit. Charger switch 140 and other switches in various embodiments may be a MOSFET in one embodiment, or other switch as desired. Battery 120 may also be coupled to system logic 135 via a diode 137 to provide power to the system logic.

A fast charge module 145 is provided in one embodiment external to the notebook computer 110 and may be coupled via a fast charge module connector 147 in the notebook computer 110. The fast charger module 145 can provide an additional source of charging current via a diode 150 to internal charging circuit 130.

In one embodiment, the fast charger module 145 includes an AC adapter 148 that may have a higher wattage than adapter 115. In further embodiments, the fast charger module 145 may include a battery 162 capable of providing desired current to charge main battery 120 in a fast manner, which is generally faster than the rate at which internal charger 130 can charge battery 120. The fast charge module 145 in one embodiment is adapted to couple to an AC power source and convert the AC power into a regulated DC voltage and DC current.

A normal charge rate can be supplied by the 65 watt adapter using the on-system board standard charger circuit. For faster charge applications, the separate fast charge module Notebook computer 110 or alternatively, fast charge module 145 detects whether a fast charge module 145 is attached and operable to provide fast charging current. The detection may be done by either interrogating the attached devices, via electromechanical switches, or via information provided by the fast charge module via connections to the notebook computer 110. The battery 120 type is also determined via interrogation or other method. The information regarding types of devices attached is used to control the voltage level provided by the fast charger module 145. The functions of interrogation may be performed by the internal charger 130 or another logic element within the notebook computer 110, such as separate circuitry or programming executed by system logic 135.

At least two voltage levels are provided by the fast charger module 145. In one embodiment, the output voltage is controlled by the notebook computer via a voltage selection module 165 or other elements within notebook computer 110 coupled to the fast charge module 145. The output voltage is controlled in accordance to battery configuration, i.e. 17V for 4S (4S1P, 4S2P) batteries, and 13V for 3S (3S1P, 3S2P, 3S3P) batteries. If not in a charging mode, the fast charge module may provide a 20 volt output or other default voltage level such as the same voltage as the AC adapter 115.

Figure 2:
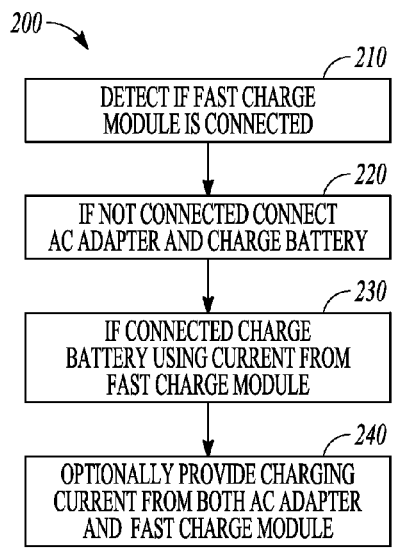
FIG. 2 is a flowchart of a method for providing current at multiple voltage levels from a fast charge module according to an example embodiment.

FIG. 2 is a flowchart of a example method 200 of charging battery 120. At 210 it is detected whether the fast charge module 145 is connected to the notebook computer 110. If the fast charge module 145 is not connected, at 215, current is provided to internal charging circuit 130 form the AC adapter 115, and then on to the battery 120 for charging at a standard rate.

If the fast charge module 145 is connected, notebook computer 110 sets the fast charge module 145 output voltage in accordance to battery configuration, i.e. 17V for 4S (4S1P, 4S2P) batteries, and 13V for 3S (3S1P, 3S2P, 3S3P) batteries at 220. Fast charge is achieved by using internal charger to receive current fast charge module 145 at 230 at the selected voltage, and provide it to battery 120.

Fast charge module 145 outputs a voltage in one embodiment that is a bit higher than a target charging voltage. Although charge current is large (1.8C), the voltage gap is fairly small (13V input from the fast charge module 145 and 12.6V charging for 3S, and 17V input and 16.8V charging for 4S) the heat generation should be much smaller than outputting a charge voltage from a single 20V supply. The temperature rise at the charger circuit (switching MOSFETs) is manageable. Thus, a fast charge is performed by a combination of fast charge module 145 and the system internal charging circuit 130.

The notebook computer controls the switches 127 and 140 in one embodiment in the following manner. When the fast charge module 145 is connected and providing current, switch 127 is set to off, and switch 140 is on. When the fast charge module 145 is not connected, both switches 127 and 140 are set to on. When neither the fast charge module 145 or the AC adapter 115 are connected, switch 140 is off, and switch 127 may be either on or off, but is kept off in one embodiment until the fast charge module 145 is detected.

Notebook computer 110 may also provide information to the battery 120 regarding the type of charging current to be provided. In one embodiment, the notebook computer 110 or fast charge module 145 directly controls the switches, whereas in further embodiments, the battery 120 receives information from the notebook computer 110 regarding whether or not fast charging current is available and capable of charging at a higher rate charging current or standard charging current.

A method 200 in FIG. 2 illustrates control of the switches 140 and 127 in one embodiment. At 210, either the fast charge module, or other control logic within the notebook computer detects whether the fast charge module 145 is connected to the notebook computer 110 and is able to supply current to charge the battery more quickly via fast charge module 145. At 220, current is provided to the battery from the internal charger circuit from current provided by adapter 115 if no fast charge module is detected. This is done in one embodiment by closing switch 140 and closing switch 127.

At 230, current is provided to the battery from the fast charge module 145 if the fast charger is detected. This is done in one embodiment, by opening switch 127 and closing switch 140. While additional current charging current is provided by the fast charge module 145, it is provided to the main batter 120 via the charging circuit 130.

In further embodiments, both chargers may provide current to the battery 120 at the same time by closing both switches 140 and 127 as illustrated optionally at 240.

Figure 3:
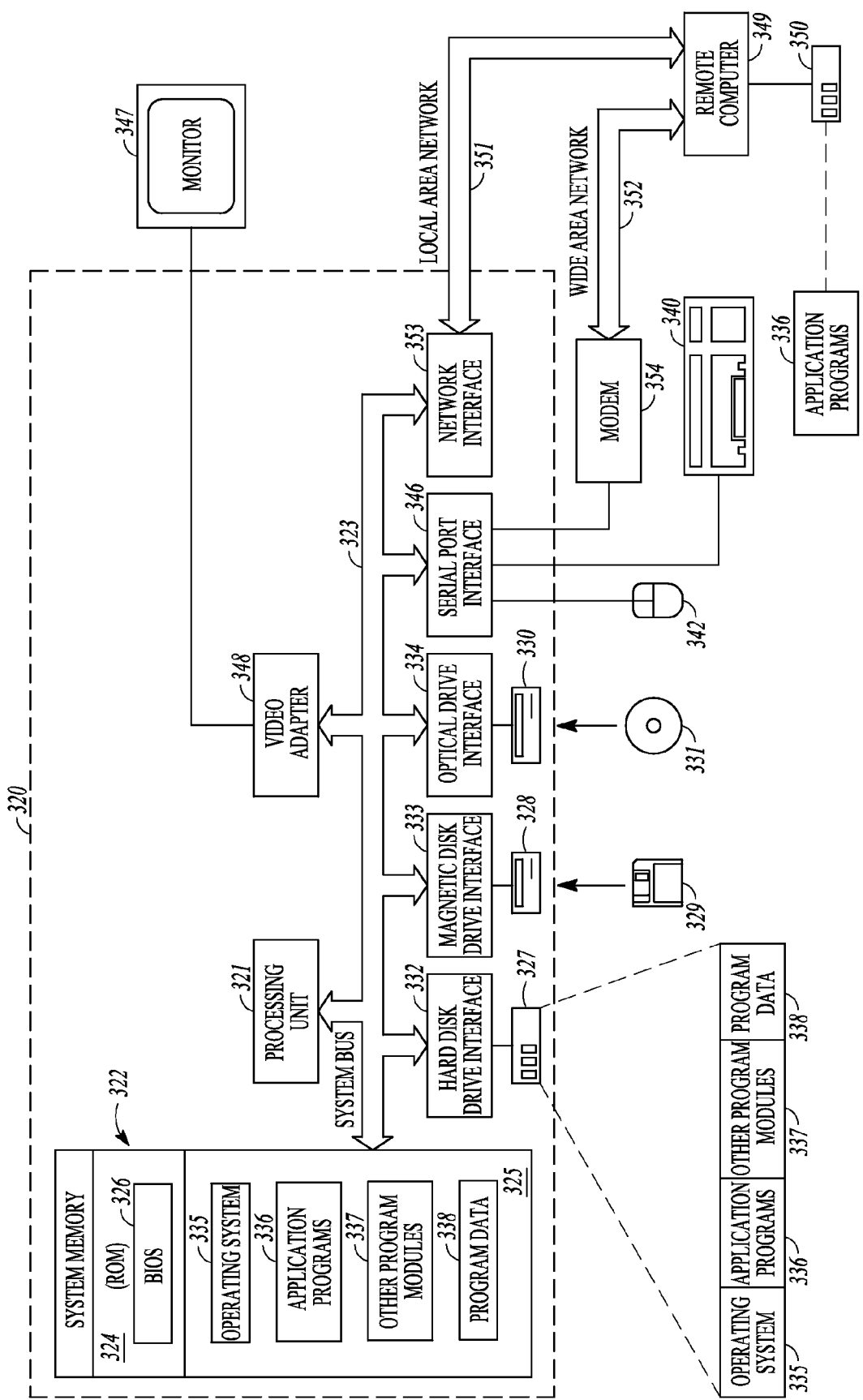
FIG. 3 is a block schematic diagram of a computer system to implement one or more methods and systems according to an example embodiment.

FIG. 3 is a block diagram of a notebook computer system to implement methods according to an example embodiment. In the embodiment shown in FIG. 3, a hardware and operating environment is provided that operates to execute programming that is stored on computer readable storage devices to implement one or more of the methods described.

As shown in FIG. 3, one embodiment of the hardware and operating environment includes a general purpose computing device in the form of a computer 320 (e.g., a personal computer, workstation, or server), including one or more processing units 321, a system memory 322, and a system bus 323 that operatively couples various system components including the system memory 322 to the processing unit 321. There may be only one or there may be more than one processing unit 321, such that the processor of computer 320 comprises a single central-processing unit (CPU), or a plurality of processing units, commonly referred to as a multiprocessor or parallel-processor environment. In various embodiments, computer 320 is a conventional computer, a distributed computer, or any other type of computer.

The system bus 323 can be any of several types of bus structures including a memory bus or memory controller, a peripheral bus, and a local bus using any of a variety of bus architectures. The system memory can also be referred to as simply the memory, and, in some embodiments, includes read-only memory (ROM) 324 and random-access memory (RAM) 325. A basic input/output system (BIOS) program 326, containing the basic routines that help to transfer information between elements within the computer 320, such as during start-up, may be stored in ROM 324. The computer 320 further includes a hard disk drive 327 for reading from and writing to a hard disk, not shown, a magnetic disk drive 328 for reading from or writing to a removable magnetic disk 329, and an optical disk drive 330 for reading from or writing to a removable optical disk 331 such as a CD ROM or other optical media.

The hard disk drive 327, magnetic disk drive 328, and optical disk drive 330 couple with a hard disk drive interface 332, a magnetic disk drive interface 333, and an optical disk drive interface 334, respectively. The drives and their associated computer-readable media provide non volatile storage of computer-readable instructions, data structures, program modules and other data for the computer 320. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 329, optical disk 331, ROM 324, or RAM 325, including an operating system 335, one or more application programs 336, other program modules 337, and program data 338. Programming for implementing one or more processes or method described herein may be resident on any one or number of these computer-readable media.

A user may enter commands and information into computer 320 through input devices such as a keyboard 340 and pointing device 342. Other input devices (not shown) can include a microphone, joystick, game pad, satellite dish, scanner, or the like. These other input devices are often connected to the processing unit 321 through a serial port interface 346 that is coupled to the system bus 323, but can be connected by other interfaces, such as a parallel port, game port, or a universal serial bus (USB). A monitor 347 or other type of display device can also be connected to the system bus 323 via an interface, such as a video adapter 348. The monitor 347 can display a graphical user interface for the user. In addition to the monitor 347, computers typically include other peripheral output devices (not shown), such as speakers and printers.

The computer 320 may operate in a networked environment using logical connections to one or more remote computers or servers, such as remote computer 349. These logical connections are achieved by a communication device coupled to or a part of the computer 320; other types of communication devices may also be used. The remote computer 349 can be another computer, a server, a router, a network PC, a client, a peer device or other common network node, and typically includes many or all of the elements described above 110 relative to the computer 320, although only a memory storage device 350 has been illustrated. The logical connections depicted in FIG. 3 include a local area network (LAN) 351 and/or a wide area network (WAN) 352. Such networking environments are commonplace in office networks, enterprise-wide computer networks, intranets and the internet, which are all types of networks.

When used in a LAN-networking environment, the computer 320 is connected to the LAN 351 through a network interface or adapter 353, which is one type of communications device. In some embodiments, when used in a WAN-networking environment, the computer 320 typically includes a modem 354 (another type of communications device) or any other type of communications device, e.g., a wireless transceiver, for establishing communications over the wide-area network 352, such as the internet. The modem 354, which may be internal or external, is connected to the system bus 323 via the serial port interface 346. In a networked environment, program modules depicted relative to the computer 320 can be stored in the remote memory storage device 350 of remote computer, or server 349. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

The invention claimed is:

1. An apparatus comprising:
   an enclosure including a processor and memory device;
   an internal charger to receive DC power from an external supply and provide charging current to charge a battery;
   a battery connector to receive current from the internal charger and to provide current to the processor and memory devices;
   a fast charge connector to receive a fast charging current from a fast charger module at multiple selectable voltage levels and selectively couple the fast charging current to the internal charger.

2. The apparatus of claim 1 and further including a voltage selection module to couple to the fast charger module and control the fast charger module to provide a selected voltage level.

3. The apparatus of claim 2 wherein the voltage selection module selects the voltage level as a function of a type of battery coupled to the battery connector.

4. The apparatus of claim 3 wherein the selected voltages levels include 13V and 17V.

5. The apparatus of claim 1 and further comprising:
   an internal charger switch coupled between the internal charge circuit and the battery connector; and
   a DC input switch coupled between a DC input and the internal charger circuit.

6. The apparatus of claim 5 and further comprising a current control device coupled between the fast charge connector and the internal charger.

7. The apparatus of claim 1 and further comprising a current control device coupled between the battery connector and the processor and memory devices.

8. The apparatus of claim 1 and further comprising a fast charge module coupled to the fast charge connector.

9. A system comprising:
   an enclosure including a processor and memory devices;
   an internal charger within the frame to receive DC power from an external supply and provide charging current to charge a battery;
   a battery connector to receive current from the internal charger and to provide current to the processor and memory devices from a battery when connected;
   a fast charge connector to receive a fast charging current from a charger module at multiple selectable voltage levels and selectively couple the fast charging current to the internal charger;
   an internal charger switch coupled between the internal charge circuit and the battery connector;

a DC input switch coupled between the a DC input and the internal charger circuit; and a current control device coupled between the fast charge connector and the internal charger.

10. The system of claim 8 and further comprising a current control device coupled between the battery connector and the processor and memory devices.

11. The system of claim 9 and further including a voltage selection module to couple to the fast charger module and control the fast charger module to provide a selected voltage level.

12. The system of claim 11 wherein the voltage selection module selects the voltage level as a function of a type of battery coupled to the battery connector.

13. The system of claim 12 wherein the selected voltages levels include 13V and 17V.

14. The system of claim 13 and further comprising a current control device coupled between the fast charge connector and the internal charger.

15. The system of claim 14 and further comprising a current control device coupled between the battery connector and the processor and memory devices.

16. The system of claim 9 and further comprising a fast charge module coupled to the fast charge connector.

17. The system of claim 9 wherein the internal charger is adapted to control the switches.

18. A method comprising:

detecting whether a fast charger module is coupled to a system having a processor and a memory device;

if the fast charger module is coupled to the system, providing a fast charging current from the fast charger module at multiple selectable voltage levels via an internal charger; and if the fast charger module is not detected as coupled to the system, providing a charging current from an AC adapter via the internal charger.

19. The method of claim 18 wherein providing current to a battery from the internal charger comprises closing a switch between the internal charger and a battery connector.

20. The method of claim 18 wherein providing current to a battery from the fast charger comprises closing a switch between the fast charger and the internal charger and opening a switch between the internal charger and the AC adapter.

21. The method of claim 18 wherein providing current to a battery from the fast charger further comprises providing current to the processor and memory device from the fast charger via a current control device.

22. The method of claim 19 and further comprising providing current from the battery to the processor and memory device via a separate current control device.

* * * * *